United States Patent [19]

Tortolina

[11] Patent Number: 5,225,519
[45] Date of Patent: Jul. 6, 1993

[54] QUICK-HARDENING COATING COMPOSITION

[75] Inventor: Antonio Tortolina, Solero, Italy

[73] Assignee: Industrie Vernici Italiane S.p.A., Milan, Italy

[21] Appl. No.: 820,897

[22] PCT Filed: May 22, 1990

[86] PCT No.: PCT/EP90/00822

§ 371 Date: Jan. 24, 1992

§ 102(e) Date: Jan. 24, 1992

[87] PCT Pub. No.: WO90/14371

PCT Pub. Date: Nov. 29, 1990

[30] Foreign Application Priority Data

May 26, 1989 [IT] Italy ................ 20668 A/89

[51] Int. Cl.$^5$ .............. C08G 63/00; C08G 67/00; C08G 69/00; C08G 63/44
[52] U.S. Cl. .................. 528/271; 528/49; 528/76; 528/78; 528/85; 528/363
[58] Field of Search .............. 528/49, 76, 78, 85, 528/271, 363

[56] References Cited

U.S. PATENT DOCUMENTS 4,192,926 3/1980 Schafer et al. ................ 521/163
4,954,577 9/1990 Dunwald et al. .............. 528/45

FOREIGN PATENT DOCUMENTS 120305 10/1984 European Pat. Off. .

Primary Examiner—John Kight, III
Assistant Examiner—T. Mosley
Attorney, Agent, or Firm—Linda Pingitore

[57] ABSTRACT

Described is a coating composition comprising at least a polycarbodiimide component having at least two carbodiimide groups per molecule, at least one anhyride component having one or more carboxylic acid anhydride groups per molecule, and a hydroxylic reagent capable of reacting with said anhydride component to generate free carboxylic polyacids, at least one among said components and reagents being a compound suitable for forming films. The composition produces fast crosslinking coatings at low temperatures.

20 Claims, No Drawings

QUICK-HARDENING COATING COMPOSITION

TECHNICAL FIELD

The present invention relates to the field of resinous binders suitable for application as coatings on various metallic and non-metallic substrates, in particular for the finishing of body parts in the automobile industry.

More specifically, the invention regards a coating composition which can harden at low temperatures, thus being useful for forming coatings on body components also having plastic parts, as well as more generally for forming protective coatings on various substrates in industry in general.

BACKGROUND ART

Among the resinous binders known to be in widespread use nowadays as coatings, in particular in the finishing of body parts in the automobile industry, are those based on polyisocyanate which are known to be highly toxic.

DISCLOSURE OF THE INVENTION

The principle aim of the present invention is to obtain a new coating composition as an alternative to those available nowadays based on polyisocyanate, and which may have faster cross-linking properties at low temperatures such as to permit a notable time-savings in production cycles.

Still another aim of the invention is to obtain a coating composition that can provide coatings with excellent chemical resistance and durability.

WAYS OF CARRYING OUT THE INVENTION

These and other aims which will become more apparent hereinafter are achieved by a coating composition characterized by the fact of comprising at least one polycarbodiimide component having at least two carbodiimide groups per molecule, at least one anhydride component having at least one carboxylic acid anhydride group per molecule, and a hydroxylic reagent capable of reacting with said anhydride component to generate free carboxylic polyacids, at least one among said components and reagents being suitable for forming films.

The polycarbodiimide component useful in the present composition can be a compound by itself or it can be incorporated together with the above-mentioned anhydride or no longer carrying the carbodiimide functionality.

In the first case, one uses a polycarbodiimide of the general formula:

$$Z_1-N=C=N-Z_2-N=C=N \ldots Z_n \quad (1)$$

in which $Z_1, Z_2, \ldots Z_n$ are linear or branched aliphatic hydrocarbon radicals or aromatic radicals, without functional groups capable of reacting with the carbodiimide group.

The polycarbodiimide of the formula (1) can be an oligomeric compound, but as a rule it is a polymer.

Such polymer can have any molecular weight provided that the solid residue is not excessively limited and both the solubility in common solvents and the compatibility with the remaining components in the system are not compromised. Preferably, polycarbodiimides of molecular weight 1500–3000 are used.

Among those polycarbodiimides which can be utilized, some which can be cited for illustrative purposes only are, for example, polycarbodiimides available from Union Carbide (USA) under the trademark Ucarlink XL 20, XL 25 SE, and XL 27 HS or else polycarbodiimides available from Bayer (Germany) under the trademark Bayderm Fix PCL.

The anhydrides useful in the composition according to the invention can be of low molecular weight or polymeric, monofunctional or polyfunctional, but the polymeric polyanhydrides are preferred.

According to a first embodiment of the invention linear polymeric polyanhydrides are used and are of the formula

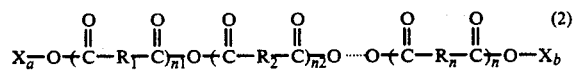

in which $X_a$ and $X_b$ are selected from among atoms of hydrogen, linear or branched aliphatic hydrocarbon radicals, and aromatic hydrocarbon radicals, derived from monofunctional carboxylic acids.

$R_1, R_2 \ldots R_n$ are selected from linear or branched aliphatic, cycloaliphatic, heterocyclic, or aromatic hydrocarbon radicals, having any functionality provided that it is not reactive with the anhydride group, such radicals being derived from polyfunctional carboxylic acids.

$n_1, n_2 \ldots n$ are whole numbers that each vary from 0 to 30. Usually, the sum of $n_1, n_2 \ldots n$ is less than or equal to 30 even if greater values are possible provided that they do not excessively limit the dry residue and do not compromise the solubility in common solvents and the compatibility with the remaining components in the system.

Examples of the radicals $X_a$ and $X_b$ are monofunctional acid radicals, for example benzoic acid, 2-ethylhexanoic acid, acetic acid, stearic acid and lauric acid.

Example of the radicals $R_1, R_2, \ldots R_n$ are polyacid radicals, for example adipic, pimelic, azelaic, sebacid, and 1,4-cyclohexanedicarboxylic acids and fatty acid dimers.

The polyanhydrides of formula (2) can have molecular weights that vary as a rule in the range from 1500 to 6000. According to an alternative embodiment of the invention, cyclic anhydrides are used containing rings or cyclic groups of anhydrides derived from polyfunctional acids.

The cyclic anhydride can be compounds of low molecular weight, carrying also only one anhydride ring per molecule but they are preferably polymeric compounds having a main polymeric chain that contains as substituents at least two anhydride rings.

Low molecular weight monofunctional cyclic anhydrides that can be used are, for example, succinic, maleic, glutaric, phthalic, hexahydrophthalic, tetrapropenylsuccinic, tetrahydrophthalic and methylhexahydrophthalic anhydride.

When polymeric cyclic polyanhydrides are employed, their main polymeric chain can be made of polymer of varied nature. It is preferred however to use those constituent polymer of cyclic polyanhydrides of the polymeric polycarbodiimides of the formula (1) above, or else polymers derived from olefinically unsaturated monomers also comprising olefinically unsaturated cyclic anhydrides.

Examples of polycarbodiimidic cyclic polyanhydrides are those obtained though reaction of a polymeric polycarbodiimide of the formula (1) above with compounds having cyclic anhydride groups derived from polyfunctional acids as well as free carboxylic groups. Compounds having cyclic anhydride groups and free carboxylic groups that can be used are, for example, trimellitic anhydride or maleated acids obtained through the reaction of olefinically or dienically unsaturated with maleic anhydride. Such unsaturated acids can be selected, for example, from sorbic acid and fatty acids with conjugated double bonds.

According to a further embodiment of the polycarbodiimidic cyclic polyanhydrides, these are made from the product of reaction of unsatured cyclic anhydrides, e.g. maleic anhydride, with polycarbodiimides of olefinic or dienic unsaturation. Such unsaturated polycarbodiimides can be obtained by reacting polycarbodiimides of the formula (1) above with unsaturated acids, e.g. sorbic acid and fatty acids with conjugated double bonds.

The polycarbodiimidic cyclic polyanhydrides described above incorporate the polycarbodiimidic component and the anhydride component of the presence invention, and can therefore not require the presence of a further polycarbodiimide. In fact, upon mixing with the above-mentioned hydroxylic reagent, they produce the desired coatings. Alternatively, these polycarbodiimidic cyclic polyanhydrides can be mixed, other than with the hydroxylic reagent, with a further polycarbodiimide of formula (1) to produce compositions with a higher number of cross-linking sites and thus coatings of a higher degree of cross-linking.

As said above, the cyclic polyanhydrides can be made of, according to a further embodiment, polymeric chains derived from olefinically unsaturated monomers, also comprising olefinically unsaturated cyclic anhydrides, e.g. acrylic monomers, vinyl monomers, maleic anhydride , itaconic anhydride. The hydroxylic reagents that constitute the further components of the coating composition of the invention can be monomers, oligomers, mono- or polyhydroxylic polymers, as for example polyester resins and/or acrylic resins functionalized with hydroxyls.

Alternatively, the hydroxylic reagent can be water also in the form of atomspheric humidity, humidity incorporated in further ingredients or filler in said compositions, or the humidity can be easily condensed into the varnish or paint product during spray application. Those hydroxylic reagents different from water than can be used are compounds commonly used in the preparation of coatings based on polyisocyanates, e.g. acrylic resins, polyesters, polyols etc.

The cross-linking mechanism among the various components of the coating compositions of the invention involves the generation of free carboxylic polyacids through the reaction of the anhydride with the hydroxylic reagent according to the reaction:

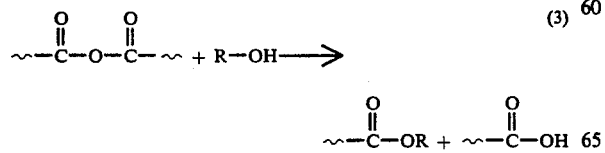

in which R is the radial of the selected hydroxylic reagent, or alternatively

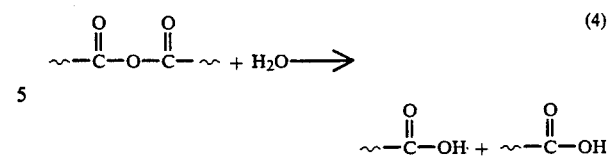

and thus the eventual reaction of the polycarbodiimide component with the free carboxylic compounds thus generated:

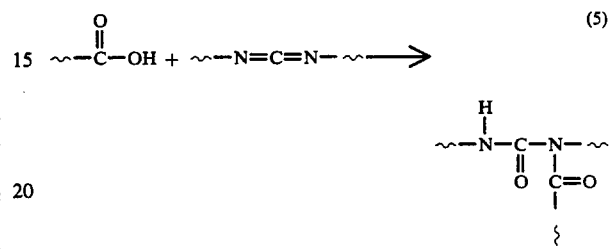

In the case where cyclic anhydrides are used, the anhydride rings are opened by the hydroxylic reagent according to the reactions (3) and (4) above and the resulting free carboxylic compounds react with the polycarbodiimides present according to the reaction (5) above.

When the above-mentioned polycarbodiimide cyclic polyanhydrides are used, these can be made to react with the hydroxylic reagent without any further addition of polycarbodiimide, as illustrated in the reaction that follows relative to a polycarbodiimidic polyanhydride derived from trimellitic anhydride:

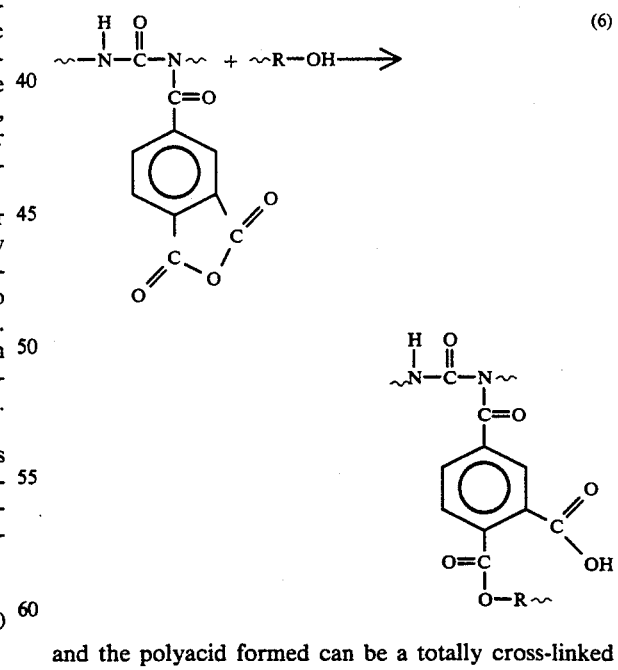

and the polyacid formed can be a totally cross-linked product.

The components of the composition according to the invention are mixed in proportions suitable for obtaining a complete cross-linking of the polycarbodiimides present. The ratios used between the carbodiimidic and anhydridic functionalities are normally between 2/1 and 1/2 and between the hydroxylic and anhydridic fuctionalities are normally between 1/1 and 3/1.

The compositions according to the invention can be of the single component type when they cross-link in the presence of humidity. In such case, they include polycarbodiimide and polyanhydride components or as compounds by themselves or as a single compound constituted by an above-mentioned polycarbodiimidic cyclic polyanhydride still containing carbodiimidic functionality. In these single-component compositions, the presence of possible fillers or ingredients containing humidity must be avoided which could cause premature hardening to the same. Alternatively, the compositions can be of the two-component type comprising a first component constituted by a mix of polycarbodiimide and hydroxylic reagent and a second component constituted by the anhydride, or else a first component constituted by the polycarbodiimide and the anhydride and a second component constituted by the hydroxylic reagent.

The application of the coating compositions takes place through conventional techniques but spray application is preferred.

After the compositions are applied, the coating gets hardened through heating that can be performed within a wide temperature range comprised for example between ambient temperature and those conventionally employed in the field of paint products. Nevertheless, an advantageous aspect of the invention consists in the possibility of using low temperatures, below 80° C., e.g. from 15° to 80° C., preferably at a temperature from ambient to 60° C. The times employed are short and depend on the temperature employed. At ambient temperature, already after 2 hours coatings are obtained without stickiness, cross-linked such as to no longer be sensitive to water.

Advantageously, the composition can include cross-linking basic catalysts, in particular tertiary amines or quaternary ammonium salts. The amines can be used as separate compounds or as aminic groups substituted on the hydroxylic reagents or on the resins with carbodiimidic functionality.

The coatings obtained with the compositions according to the invention offer a high level of hardness and resistance to solvents, as demonstrated by double rubbing test with xylene.

The examples that follow are purely illustrative, and non-limitative, of some possible embodiments of the compositions according to the invention. Based on the description above and the examples that follow, a man skilled in the art can achieve many other compositions all falling within the scope of the invention as presently defined. It is to be noted that Examples 1, 4 to 6 and 11 are dealing with the preparation of starting materials, while the residual examples are coating compounds which may use such starting materials.

In the examples, the following products have been employed:

| Products used |  |  |
|---|---|---|
| 1) A 101 hydroxylated acrylic polymer having: |  |  |
| OH % | 4.5 |  |
| % solids | 60 |  |
| Gardner viscosity | w |  |
| weight mean molecular weight (Mw) | 5500-6500 |  |
| 2) Carbodiimides (available from Union Carbide - USA): |  |  |
|  | % Solids | Equivalent Weight |

-continued

| Products used |  |  |
|---|---|---|
| Ucarlink XL 20 | 50 in MPA | 175 |
| Ucarlink XL 25 SE | 50 in MPA | 300 |
| Ucarlink XL 27 HS | 74 in MPA | 220 |
| 3) Desmophen 670 - Bayer - hydroxylated polyester |  |  |
| 4) Byk 300 - silicone additive (used as surfactant) |  |  |
| 5) MPA - methoxypropyl acetate (used as solvent). |  |  |

EXAMPLE 1

|  | Moles |
|---|---|
| Adipic acid | 15 |
| Azelaic acid | 15 |
| Lauric acid | 2 |
| Acetic anhydride | 45 |

In a receptor equipped with a fractionating column, the acetic acid which forms is slowly extracted and also the excess of acetic anhydride by heating up to 160° C. at the end and also under vacuum.

The product obtained is diluted to 50% with toluene.

EXAMPLE 2

Enamel cross-linkable with linear polyanhydride and polycarbodiimide

|  | grams |
|---|---|
| A 101 | 39.49 |
| Titanium dioxide Kromos RN 59 | 24.33 |
| MPA | 7.62 |
| Byk 300 | 1 |
| Ucarlink XL 27HS | 13.27 |
| PAL 01 (Ex. 1) | 13.27 |
| Dimethyl lauryl amine | 0.8 |

EXAMPLE 3

Enamel cross-linkable with monofunctional cyclic anhydride

|  | grams |
|---|---|
| A 101 | 44.28 |
| Titanium dioxide Kronos RN 59 | 22.14 |
| MPA | 7.18 |
| Ucarlink XL 27 HS | 11.07 |
| Byk 300 | 0.2 |
| Succinic anhydride 23% in acetone | 14.76 |
| Dimethyl lauryl amine | 0.37 |

EXAMPLE 4

Preparation of polycarbodiimidic cyclic polyanhydride (without residual carbodiimidic groups)

| PCC 01 | grams |
|---|---|
| A Ucarlink XL 27 HS | 300 |
| B Solution of trimellitic anhydride 20% in MPA | 864 |

With a inside, the reactor is heated to 50°±10° C. and B is added slowly over a period of about 3 hours. The disappearance of the carbodiimidic group is monitored with an I.R. spectrophotometer. The reactor is cooled and discharged.

EXAMPLE 5

Preparation of polycarbodiimidic cyclic polyanhydride (with residual carbodiimidic groups (about 52%))

| PCC 02 | | grams |
|---|---|---|
| A | Ucarblink XL 20 | 360 |
| B | Solution of trimellitic anhydride 20% in MPA | 432 |

With A inside, the reactor is heated to 50°±10° C. and B is added slowly over a period of about 2 hours. The reactor is cooled and discharged.

EXAMPLE 6

Preparation of polycarbodiimidic cyclic polyanhydride (with residual carbodiimidic groups (about 66%))

| PCC 03 | | grams |
|---|---|---|
| A | Ucarlink XL 25 SE | 600 |
| B | Solution of trimellitic anhydride 20% in MPA | 288 |

With A inside, the reactor is heated to 50°±10° C. and B is added slowly over a period of about 2 hours. The reactor is cooled and discharged.

EXAMPLE 7

Enamel cross-linkable with one polycarbodiimidic cyclic polyanhydride

| | grams |
|---|---|
| A 101 | 38.90 |
| Titanium dioxide Kronos RN 59 | 23.66 |
| Byk 300 | 0.2 |
| Toluene | 3.96 |
| PCC 01 (Example 4) | 33.26 |

EXAMPLE 8

Enamel cross-linkable with polycarbodiimidic cyclic polyanhydride and polycarbodiimide

| | grams |
|---|---|
| A 101 | 33.38 |
| Titanium dioxide Kronos RN 59 | 23.61 |
| Toluene | 6.16 |
| Byk 300 | 0.2 |
| Ucarlink XL 27 HS | 7.51 |
| PCC 01 (Example 4) | 29.14 |

Example 9

Enamel cross-linkable with polycarbodiimidic cyclic polyanhydride containing also the carbodiimidic functionality

| | gram |
|---|---|
| Desmophen 670 | 17.52 |

-continued

| | gram |
|---|---|
| Butyl acetate | 9.51 |
| Titanium dioxide Kronos RN 59 | 22.29 |
| Byk 300 | 0.2 |
| PCC 02 (Example 5) | 50.55 |
| Dimethyl lauryl amine | 0.03 |

EXAMPLE 10

Clear varnish formed from carbodiimide functionalized polycarbodiimidic cyclic polyanhydride cross-linkable with humidity.

| | grams |
|---|---|
| PCC 03 (Example 6) | 99.8 |
| Dimethyl lauryl amine | 0.2 |
| Example 11 | |
| PCP 01 Polymeric cyclic polyanhydride | |
| Styrene | 20 |
| Methyl methacrylate | 9 |
| Butyl acrylate | 10 |
| Maleic anhydride | 11 |
| Vazo 67 (polymerization initiator of Du Pont) | 2 |
| Butyl acetate | 48 |

The enamels and paints prepared in the examples above were applied by spraying on different metallic, plastic, wood, etc., substrates pre-painted or not with primer, and were hardened at low temperatures from 35° to 60° C., for periods of 15 minutes to 1 hour, or else at ambient temperature, giving coatings of a high level of hardness and resistance to solvents. Such characteristics turn out to be equal to those of the best conventional painted products, fully conforming to the most stringent specifications of the users.

I claim:

1. Coating compositions comprising at least one polycarbodiimide component having at least two carbodiimide groups per molecule, at least one anhydride component having at least one carboxylic acid anhydride group per molecule, and a hydroxylic reagent capable of reacting with said anhydride component to generate free carboxylic polyacids, wherein said polycarbodiimide component is present as a compound by itself or at least part of said polycarbodiimide component has been prereacted through at least part of its carbodiimide groups with said anhydride component so as to form a complex compound, at least one among said components and reagents being a compound suitable for forming films.

2. Composition according to claim 1 wherein said polycarbodiimide component is selected from among compounds of the following general formula (1):

$$Z_1-N=C=N-Z_2-N=C=N \ldots Z_n \qquad (1)$$

in which $Z_1$, $Z_2$, ... are linear or branched aliphatic hydrocarbon radicals or aromatic radicals, having at least two carbodiimide groups per molecule said radicals $Z_1$, $Z_2$, ... $Z_n$ being radicals without functional groups capable of reacting with the carbodiimide groups.

3. Composition according to claim 1 wherein said anhydride component is selected from among linear polymeric anhydrides of the formula

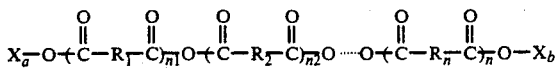

in which
- $X_a$ and $X_b$ are selected from among atoms of hydrogen, linear or branched aliphatic hydrocarbon radicals, or aromatic hydrocarbon radicals, derived from monofunctional carboxylic acids,
- $R_1, R_2, \ldots R_n$ are selected from among linear or branched aliphatic, cycloaliphatic, heterocyclic, and aromatic hydrocarbon radicals, possibly having substituents nonreactive with the anhydride group, said radicals being derived from polyfunctional carboxylic acids, and $n_1, n_2, \ldots n$ are whole numbers that each vary from 0 to 30.

4. Composition according to claim 1 wherein said anhydride component is a monofunctional cyclic anhydride selected from among succinic anhydride, maleic anhydride, glutaric anhydride, phthalic anhydride, hexahydrophthalic anhydride, tetrapropenylsuccinic anhydride, tetrahydrophthalic anhydride or methylhexahydrophthalic anhydride.

5. Composition according to claim 1 wherein said anhydride component is a cyclic polyanhydride selected from among polymers having at least two cyclic anhydride groups per molecule.

6. Composition according to claim 5 wherein said cyclic polyanhydride comprises a polycarbodiimide polymer carrying on the main polymeric chain said at least two substituents constituted by cyclic anhydride groups.

7. Composition according to claim 6 wherein said cyclic polyanhydride is the product of reaction of a polymeric polycarbodiimide of formula (1)

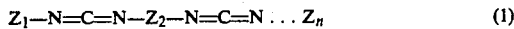

in which $Z_1, Z_2, \ldots Z_n$ are linear or branched aliphatic hydrocarbon radicals or aromatic radicals, having at lest two carbodiimide groups per molecule, said radicals $Z_1, Z_2, \ldots Z_n$ being radicals without functional groups capable of reacting with the carbodiimide groups, with compounds derived from polycarboxylic acid having cyclic anhydride groups and at least a free carboxylic group per molecule.

8. Composition according to claim 7 wherein said cyclic anhydride is selected from among trimellitic anhydride or the products of reaction of maleic anhydride with olefinically unsaturated carboxylic acids.

9. Composition according to claim 6 wherein said cyclic polyanhydride is the product of reaction between a polycarbodiimide of formula (1)

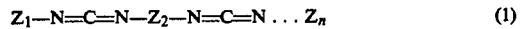

in which $Z_1, Z_2, \ldots Z_n$ are linear or branched aliphatic hydrocarbon radicals or aromatic radicals, having at least two carbodiimide groups per molecule, said radicals $Z_1, Z_2, \ldots Z_n$ being radicals without functional groups capable of reacting with the carbodiimide groups pre-reacted with unsaturated carboxylic acids and an unsaturated cyclic anhydride derived from unsaturated polyfunctional carboxylic acids.

10. Composition according to claim 9 wherein said cyclic polyanhydride is the product of said polycarbodiimide with olefinically or dienically unsaturated carboxylic acids and their anhydrides.

11. Composition according to claim 5 wherein said cyclic polyanhydride is a polymer derived from olefinically unsaturated monomers.

12. Composition according to claim 11 wherein said olefinically unsaturated monomer containing the cyclic anhydride group is selected from maleic anhydride or itaconic anhydride.

13. Coating composition according to claim 1 comprising said polycarbodiimide component and said anhydride component incorporated in a single compound constituted by a cyclic polyanhydride according to claim 6.

14. Composition according to claim 1 wherein said hydroxylic reagent capable of reacting with said anhydride component is selected from among monohydroxylic and poly-hydroxylic, monomeric, oligomeric or polymeric compounds, or water.

15. Composition according to claim 1 wherein the ratios between the carbodiimide and anhydride functionalities range of from 2/1 to 1/2 and the ratios between the hydroxylic and anhydride functionalities range between 1/1 and 3/1.

16. Composition according to claim 1 comprising a basic catalyst selected from among tertiary amines or quaternary ammonium salts.

17. Coating method consisting of applying to a substrate a composition according to claim 1 and of heating the substrate thus coated at a temperature of about 15° to 80° C.

18. Manufactured article bearing a coating obtained with the composition according to claim 1.

19. Coating composition according to claim 13, wherein said cyclic polyanhydride is the product of reaction of a polymeric polycarbodiimide of formula (1)

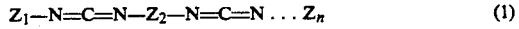

in which $Z_1, Z_2, \ldots Z_n$ are linear or branched aliphatic hydrocarbon radicals or aromatic radicals, having at least two carbodiimide groups per molecule, said radicals $Z_1, Z_2, \ldots Z_n$ being radicals without functional groups capable of reacting with the carbodiimide groups, with a compounds derived from polycarboxylic acid having cyclic anyride groups and at least a free carboxylic group per molecule.

20. Coating composition according to claim 13 wherein said cyclic polyanhydride is the product of reaction of a polycarbodiimide of formula (1)

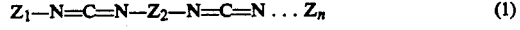

in which $Z_1, Z_2, \ldots Z_n$ are linear or branched aliphatic hydrocarbon radicals or aromatic radicals, having at least two carbodiimie groups per molecule, said radicals $Z_1, Z_2, \ldots Z_n$ being radicals without functional groups capable of reacting with the carbodiimide groups, with unsatured carboxylic acids and an unsaturated cyclic anhydride derived from unsaturated polyfunctional carboxylic acids.

* * * * *